United States Patent [19]

Berger

[11] Patent Number: 4,477,849
[45] Date of Patent: Oct. 16, 1984

[54] MAGNETIC DISC DRIVE HEAD ALIGNMENT SYSTEM

[75] Inventor: James K. Berger, Malibu, Calif.

[73] Assignee: Pioneer Magnetics, Inc., Santa Monica, Calif.

[21] Appl. No.: 367,358

[22] Filed: Apr. 12, 1982

[51] Int. Cl.³ .................... G11B 5/58; G11B 21/10
[52] U.S. Cl. .................................................. 360/77
[58] Field of Search ........................................ 360/77

[56] References Cited

U.S. PATENT DOCUMENTS 4,085,427  4/1978  Dunn .................................. 360/77

Primary Examiner—George G. Stellar
Attorney, Agent, or Firm—Keith D. Beecher

[57] ABSTRACT

A system is provided for aligning the read/write magnetic heads in a multi-head disc drive which includes a four quadrant balanced circuit and which responds to the peak amplitudes of dibits recorded in servo tracks on the discs of a prerecorded servo disc pack as read by the various heads to produce, without offset errors, digital signals representative of individual head misalignments; the system being insensitive to distortions of waveform. The system can also be used to provide an analog position signal to a feedback servo mechanism for positioning the head, or heads, which is insensitive to waveform distortions and to baseline shift due to write recovery.

6 Claims, 4 Drawing Figures

MAGNETIC DISC DRIVE HEAD ALIGNMENT SYSTEM

BACKGROUND OF THE INVENTION

Magnetic disc drives for recording digital data are well known to the art. In such drives it is desirable to achieve the highest recording density possible, such recording density being a function of both the number of annular tracks per radial inch of disc surface and the number of bits per inch along each track. The optimum number of tracks on the individual discs is dependent on the precision of the head positioning system and on the precision in the alignment of the various read/write heads in the disc drive. The system of the present invention provides for the precise alignment of each of the read/write heads in the disc drive so that an optimum number of tracks per radial inch of the individual discs may be achieved.

The discs incorporated into present-day disc drives are usually referred to as a disc pack, and these discs are stacked one above the other to be sensed by a plurality of magnetic read/write heads mounted in vertical alignment and positioned by a single actuator. In one type of present-day head positioning system used in disc drives, one of the heads (servo disc surface) and one disc surface are dedicated to the generation of dibit position signals for an associated servo system. A plurality of servo tracks are recorded in concentric circles on the dedicated servo disc surface, and the servo head produces the dibit signals which are indicative of the relative position of the servo head and the servo tracks.

For interchangeability of the disc packs, the various tracks recorded on each of the disc surfaces must be closely aligned with the pre-recorded servo tracks on the dedicated servo disc surface so that the readback of the data from each disc pack is possible on recorders other than the one on which the data was recorded.

When the servo head is held in registry with the servo tracks on the dedicated servo disc surface, and the remaining read/write heads are aligned with the servo head, the remaining heads will be properly positioned over the corresponding data tracks on other disc surfaces. As mentioned above, an objective of the present invention is to provide a system which enables the remaining magnetic heads to be precisely aligned with the servo head, so that they will all be properly positioned with respect to the data tracks on the other disc surfaces.

The normal procedure for assuring that the read/write heads are in vertical alignment is to place a disc pack into the disc drive which has pre-recorded and precisely positioned servo tracks on all the disc surfaces. Such pre-recorded servo disc packs are commercially available for use in head alignment and are usually referred to as "CE" (Customer Engineer) packs. By reading the signals from the individual heads, as the heads read the various servo tracks, and by feeding such signals to a display device, each head can be adjusted until it is in precise tracking engagement with the tracks on the surface of the corresponding disc.

The present invention, as mentioned above, provides a system for reading dibit signals generated by the various heads of a disc drive, as these heads read the various servo tracks on the pre-recorded servo disc pack, and it provides digital outputs representative of any misalignments of the various heads. Each head can then be adjusted to a position at which the digital output signal for that head indicates precise alignment.

SUMMARY OF THE INVENTION

A head alignment system is provided which responds to dibits from a magnetic head in a disc drive which is sensing a servo disc pack, two complemented series of dibit signals being sensed by the system, which are of equal amplitude when the head is properly aligned, but which have different amplitudes when the head is misaligned. The system of the invention includes a four quadrant balanced circuit which senses four distinct peak amplitudes of the dibit signals for each measurement, and the system performs an algebraic addition and subtraction of the four peak amplitudes to provide an analog signal, free from offset errors, which is representative of head misalignment. The resulting analog signal is preferably transformed into a digital output which may be appropriately displayed, so that the proper adjustments may be made to the head to bring it into precise alignment with the servo head and in precise tracking relationship with its disc.

DETAILED DESCRIPTION OF THE ILLUSTRATED EMBODIMENT

Figure 1:
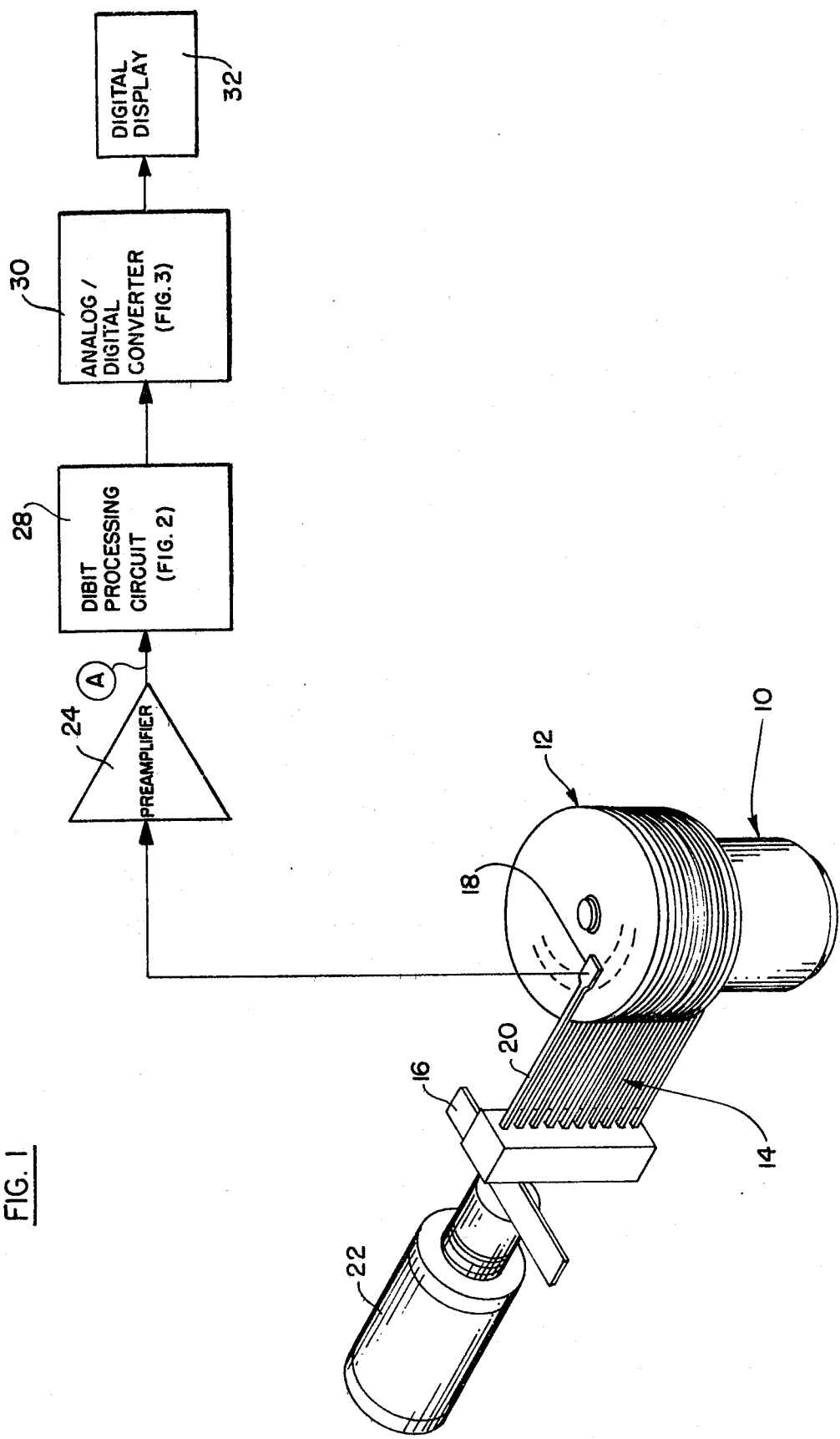
FIG. 1 is a block diagram of the head alignment system of the present invention coupled to a typical disc drive.

In the system shown in FIG. 1, a typical disc drive is illustrated which includes a disc pack 10 on which a stack of magnetic recording discs 12 are supported, the disc pack being rotated by a motor drive (not shown). The disc drive also includes a stack of magnetic read/write heads 14 which are mounted on a common support 16. Each read/write head 18 is supported on the end of an arm 20 which is attached to the common support 16. A linear motor 22 is coupled to the common support 16, and this motor is actuated to move all of the heads in the stack 14 radially with respect to the corresponding discs 12 to predetermined radial positions with respect to the disc. It is usual practice for one of the heads 18 to be associated with a servo disc included in the stack of discs 12 and, as mentioned above, to read the servo tracks on the dedicated surface of the servo disc to generate dibit signals which are used to assure that all the read/write heads in the stack will be properly positioned with respect to the data tracks on the other discs of the pack. In such a system, it is clear that all of the heads must be properly aligned with the servo head to assure that when different disc packs are inserted into the disc drive, they will continue properly to track the data tracks.

As also mentioned above, for head alignment purposes, the data disc pack is replaced by a servo disc pack, on which dibit servo tracks are recorded on all the discs, to be sensed by the read/write heads normally used for reading and writing data on the discs. With the servo disc pack in place, the read/write heads are each sensed as they track the servo information on the servo discs, and the system of the invention is used to assure that all the read/write heads are properly aligned with the servo head. Whenever a misalignment of a read/write head is indicated, its arm 20 is adjusted with respect to the common support 16 until alignment is achieved.

As shown in FIG. 1, the output of any one of the read/write heads 18, as it senses a servo track on the servo disc may be connected to a preamplifier 24. As the head reads the dibits recorded in the servo tracks, the dibit signals are amplified in preamplifier 24. So long as the particular head is properly tracking the corresponding servo tracks, the peak amplitudes of each of the segments, making up the dibits are the same. However, any misalignment of a head causes the peak amplitudes of the two segments of the dibit signal to be different.

The system of the present invention involves a dibit processing circuit 28, which will be described in detail in conjunction with FIG. 2, and which, as stated above, incorporates a four quadrant balanced circuit for examining the relative peak amplitudes of the two segments of the dibit signal so that any misalignment of the head may be sensed. The balanced nature of the four quadrant balanced circuit cancels out all offsets, so that no offset correction is necessary.

Figure 3:
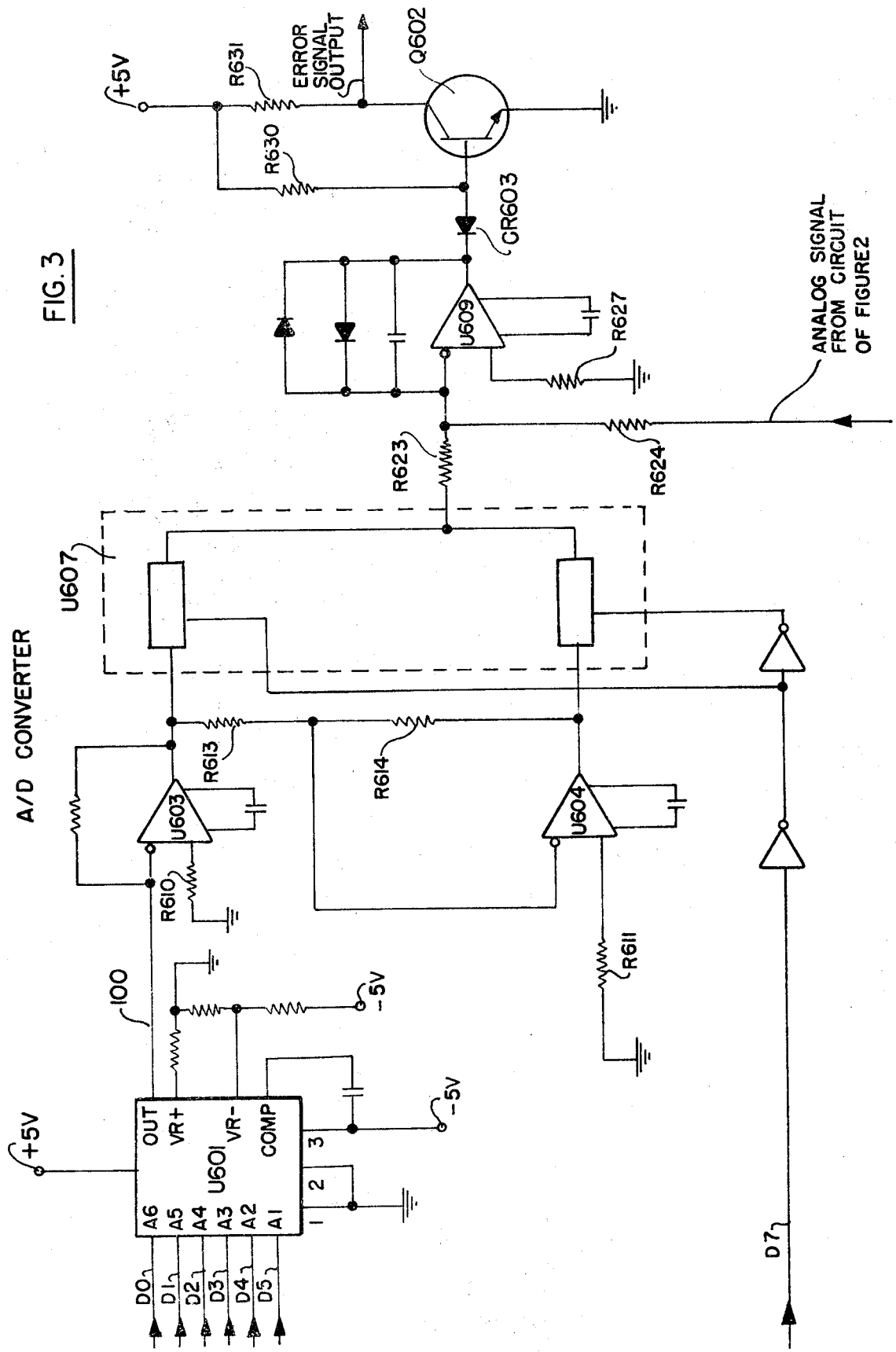

The output of the dibit processing circuit 28 in the illustrated embodiment is applied to an analog-to-digital converter 30, to be described in conjunction with FIG. 3, and the digital output from the converter is fed to a digital display device 32. The display device 32 indicates with high precision any misalignments of the head being tested, and appropriate adjustments may be made to the corresponding arm 20 so that the reading on the digital readout device is reduced to zero, which indicates that the head is properly aligned.

It is evident that the output of the dibit processing circuit 28 may be used in normal operation of the disc drive, and in conjunction with the servo head, to provide an analog signal to an appropriate servo mechanism to maintain the servo head properly centered on the corresponding servo tracks.

Each servo track of each disc of the servo disc pack comprises, in reality, two adjacent tracks which are known as the even servo track (E) and the odd servo track (O).

Figure 4:
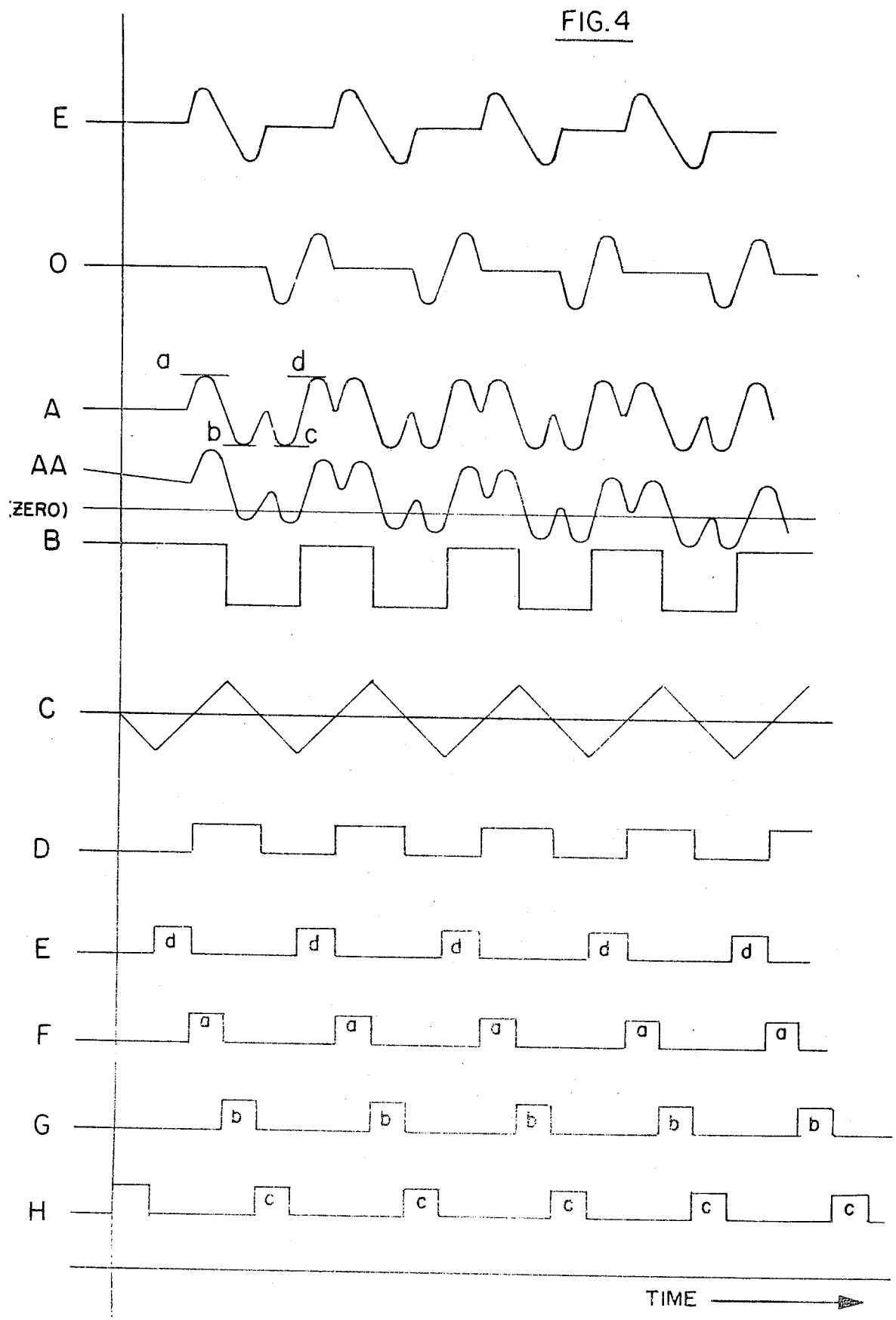
FIG. 4 is a series of curves useful in explaining the operation of the portion of the system shown in FIG. 2.

The dibits sensed by the head being tested from the even servo track (E) are designated by the curve E in FIG. 4, and the dibits sensed by the head from the adjacent odd servo track (0) are represented by curve 0. The resulting dibit signal derived from the output of preamplifier 24 is shown in curve A in FIG. 4.

Figure 2:
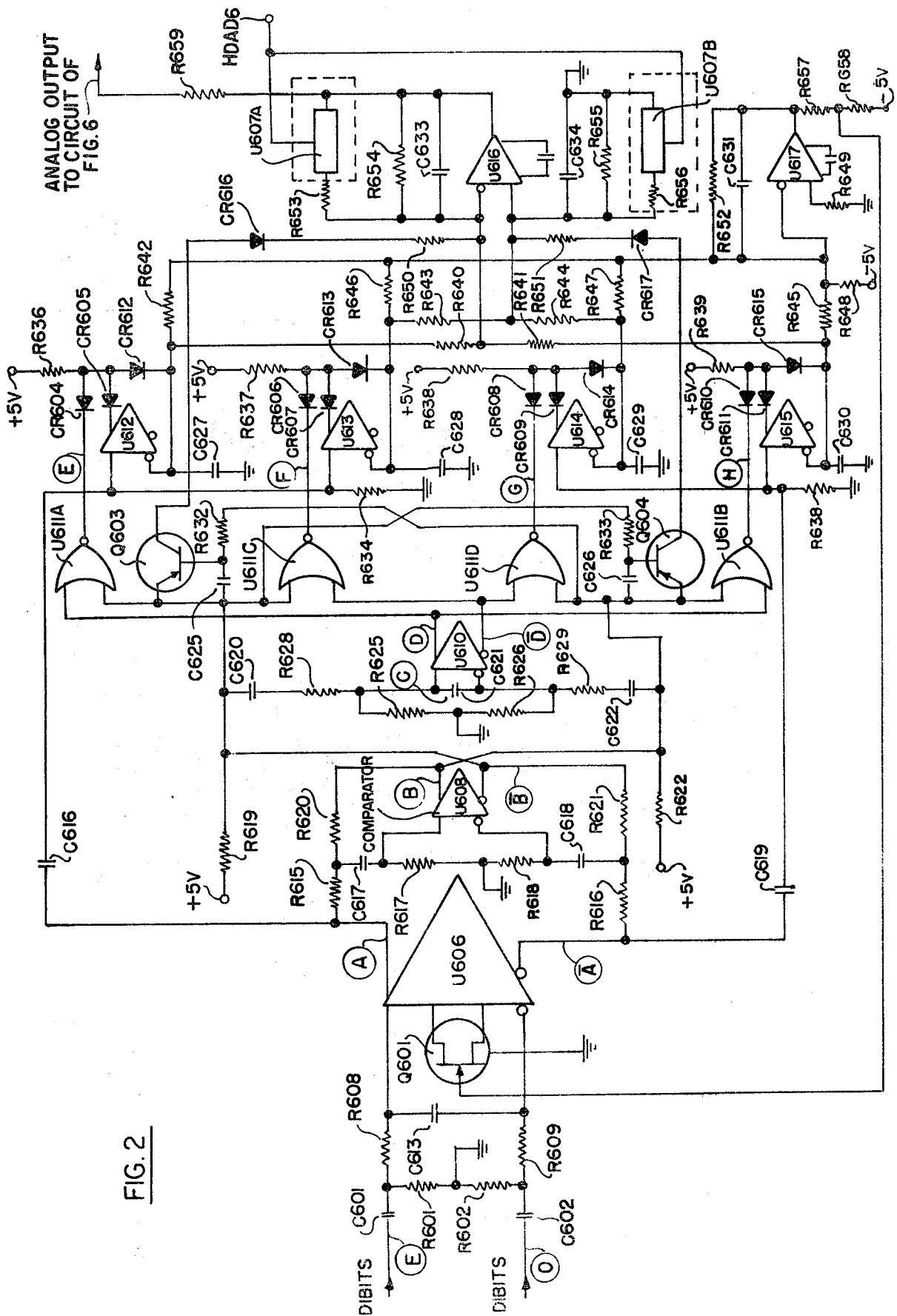
FIGS. 2 and 3 are schematic circuit diagrams of the head alignment system of the invention in one of its embodiments.

The dibit signals E and O derived from the head being tested are applied to a linear amplifier U606 in the circuit of FIG. 2 (which constitutes preamplifier 24) through a filter network including a pair of 0.1 microfarad series capacitors C601 and C602, which are shunted by a pair of 1 kilo-ohm resistors R601 and R602, whose common junction is connected to ground. The filter also includes a pair of 330 ohm series resistors R608 and R609, and a 33 picofarad shunting capacitor C613. Automatic gain control is provided for the linear amplifier U606 by a solid state element Q601 which may be of the type designated 2N4869A.

The output A and its complement $\bar{A}$ of linear amplifier U606 are applied to the inputs of a comparator U608 through 1 kilo-ohm resistors R615, R616, and through 0.01 microfarad coupling capacitors C617 and C618. The capacitors are respectively connected to grounded 10 kilo-ohm resistors R617 and R618. The output terminals of the comparator U608 are connected respectively to 10kilo-ohm resistors R620 and R621, which are respectively connected to the resistors R615 and R616. The output terminals of the comparator U608 are also respectively connected through 1 kilo-ohm resistors R619 and R612 to the positive terminal of a 5 volt unidirectional potential source. These output terminals are also coupled to a second comparator U610 through respective 0.01 microfarad coupling capacitors C620 and C622, and 10 kilo-ohm resistors R628 and R629. The resistors are connected to the respective inputs of comparator U610, and to respective grounded 10 kilo-ohm resistors R625 and R626, the resistors being shunted by a 330 picofarad capacitor C621. The circuitry of comparators U608 and U610 constitutes balanced gating circuitry for four peak detector circuits to be described.

The gating circuitry of the comparators U608 and U610 provide for a quadrature shift of the output signal from the linear amplifier U606 which is independent of frequency. As illustrated, the gating circuitry is completely balanced. The linear amplifier U606 produces a waveform A (FIG. 4) at one of its outputs, and a complement $\bar{A}$ of that signal at its other output. The signals are applied to comparator U608 which produces an output signal B (FIG. 4) at one of its outputs, and the complement $\bar{B}$ of output signal B at its other output. These signals are applied across capacitor C621 to produce the waveform C (FIG. 4) which is applied to comparator U610, so that the comparator U610 provides an output D (FIG. 4) at one of its output terminals, and the complement $\bar{D}$ of output D at the other of its output terminals. As shown in FIG. 4, the output D is shifted 90° in phase with respect to the output B. It is particulaly important to notice that this phase shift is independent of the frequency of the dibit signal. Because of this frequency independence, the system may be used with many different disc drives without adjustment.

The output D from comparator U610 is applied to "nor" gates U611A and U611B, and the complement output $\bar{D}$ of comparator U610 is applied to "nor" gates U611C and U611D. The complement output $\bar{B}$ of comparator U608 is applied to "nor" gates U611A and U611C, and the output (B) of comparator U608 is applied to "nor" gates U611D and U611B.

"Nor" gate U611A provides gating pulses E (FIG. 4) which are timed to occur at the same time as the peaks d in waveform A. "Nor" gate U611C provides gating pulses F (FIG. 4) which occur at the same time as the peaks a in the waveform A of FIG. 4. "Nor" gate U611D provides gating pulses G (FIG. 4) which are timed with the peaks b of the waveform A; and "nor" gate U611B produces a pulse signal H (FIG. 4) which occur in time with the peaks c of waveform A in FIG. 4.

The output (A) (FIG. 4) of linear amplifier U606 is introduced to one of the inputs of operational amplifiers U612 and U613 through a 0.1 microfarad coupling capacitor C616, and the signal appears across a grounded 2.2 kilo-ohm resistor R634. The complement output ($\bar{A}$) from linear amplifier U606 is introduced through a 0.1 microfarad capacitor C619 to the inputs of operational amplifiers U614 and U615, and this latter signal appears across a 2.2 kilo-ohm grounded resistor R638. The other input of operational amplifier U612 is connected to a grounded 0.1 microfarad capacitor C627, and the other input terminal of operational amplifier U613 is connected to a grounded 0.1 microfarad capacitor C628. The other input of operational amplifier U614 is connected to a grounded 0.1 microfarad capacitor C629, and the other input of operational amplifier U615 is connected to a 0.1 microfarad grounded capacitor C630.

The output of "nor" gate U611A is connected through a diode CR604 and through a diode CR612 to grounded capacitor C627, and the output of operational amplifier U612 is fed through a diode CR605 to the junction of diodes CR604 and CR612. This latter junction is connected to the positive terminal of the 5 volt unidirectional potential source through a 470 ohm resistor R636. The circuitry of operational amplifier U612 functions as a peak detector sample and hold circuit, so that capacitor C627 is charged to a voltage corresponding to the voltage of the peaks d of waveform A of FIG. 4. In like manner, capacitor C628 is charged to a voltage corresponding to the amplitude of peak a of the waveform of curve A of FIG. 4; whereas capacitor C629 is charged to a voltage corresponding to the peak b of waveform A of FIG. 4, and capacitor C630 is charged to a voltage corresponding to the amplitude of peak c of waveform A of FIG. 4.

The voltage across capacitor C627 is introduced to one of the inputs of operational amplifier U616 through a 49.9 kilo-ohm resistor R640, and the voltage across capacitor C628 is introduced to the other input of operational amplifier U616 through a 49.9 kilo-ohm resistor R643. The voltage across capacitor C629 is introduced to the second input of operational amplifier U616 through a 49.9 kilo-ohm resistor R644; and the voltage across capacitor C630 is introduced to the first input of operational amplifier U616 through a 49.9 kilo-ohm resistor R641.

The output of operational amplifier U616 is connected back to the input through a 280 kilo-ohm resistor R654 which is shunted by a 0.01 microfarad capacitor C633. Resistor R654 is shunted by a solid state CMOS switch U607A and a 30.9 kilo-ohm resistor R653. The other input of operational amplifier U616 is connected to a grounded 0.01 microfarad capacitor C634 and to a grounded 280 kilo-ohm resistor R655. The resistor R655 is shunted, by a 30.9 kilo-ohm reistor R656 and a CMOS switch U607B. The CMOS switches U607A, U607B are actuated by a control signal HDA06 to increase the sensitivity of the system for fine adjustments of the head being tested. Amplifier U616 produces an analog output which is applied to the circuit of FIG. 3 through a 150 ohm resistor R659.

The circuitry associated with operational amplifier U616 is such that the output of that amplifier is the differential of the algebraic sum of peaks "a" and "b" and the algebraic sum of peaks "c" and "d" of waveform A of FIG. 4. It is evident that so long as the head being tested is aligned with the servo tracks, the output of the operational amplifier U616 is zero. However, should the head be misaligned in a direction such that the amplitude of dibit waveform E is greater than the amplitude of waveform O, a positive voltage will appear at the output of the operational amplifier; and if the head becomes misaligned in the opposite direction so that the amplitude of the dibit waveform O is greater than the amplitude of the E dibit waveform, a negative output will appear from amplifier U616.

Because of the automatic gain control of amplifier U606, the positive or negative output of amplifier U616 is at all times proportional to the ratio of the peaks of waveform A of FIG. 4, and is independent of actual amplitude. Also, by sensing all four peaks of waveform A of FIG. 4, rather than merely two peaks, as is the case in the usual prior art system, the output of amplifier U616 is not sensitive to distortion of waveform of the dibits O and E of FIG. 4, and is not subject to offset errors.

The automatic gain control voltage for the solid state device Q601 is supplied by an operational amplifier U617, whose output terminal is connected to the negative terminal of the 5 volt unidirectional voltage source through a 10 kilo-ohm resistor R657 and a 15 kilo-ohm resistor R658. The junction of these resistors is connected back to the gate electrode of element Q601, as shown.

Capacitor C627 and capacitor C628 are connected through respective 49.9 kilo-ohm resistors R642 and R646 to one of the input terminals of operational amplifier U617; and capacitors C629 and C630 are connected through respective 49.9 kilo-ohm resistors R647 and R645 to the same input terminal. The input terminal is also connected to the negative terminal of the 5 volt unidirectional voltage source through a 49.9 kilo-ohm resistor R648. The other input terminal of amplifier U617 is connected to a grounded 10 kilo-ohm resistor R649. The output of the operational amplifier U617 is connected back to the first input through a 3.3 megohm resistor R652 which is shunted by a 0.1 microfarad capacitor C631. The circuitry associated with amplifier U617 causes it to produce at its output a signal corresponding to the algebraic sum of the peak amplitudes a, b, c and d of the waveform A of FIG. 4, and this voltage is used for AGC purposes.

The complement output $\overline{B}$ of comparator U608 is also connected to the emitter electrode of a PNP transistor Q603 which may be of the type designated 2N2907, and the output B of comparator U608 is also connected to the emitter of a PNP transistor Q604 which also may be of the type designated 2N2907. The base of transistor Q603 is coupled to one input of "nor" gate U611C, and to one input of "nor" gate U611A, through a 0.01 microfarad capacitor C625, which capacitor is also connected through a 100 kilo-ohm resistor R633 to the base of transistor Q604. The base of transistor Q604 is also coupled through a 0.01 microfarad capacitor C626 to an input of "nor" gate U611D and an input of "nor" gate U611B, and this capacitor is also connected through a 100 kilo-ohm resistor R632 to the base of transistor Q603.

The collector of transistor Q603 is connected through a diode CR616 and through a 33 kilo-ohm resistor R650 to one input of operational amplifier U616; and the collector of transistor Q604 is connected through a diode CR617 and through a 22 kilo-ohm resistor R651 to the other input of operational amplifier U616.

The transistors Q603 and Q604 serve to prevent false readings by the system in the event the misalignments of the head being tested are in excess of a predetermined maximum. Without the circuit of these transistors, excessive head misalignments would cause the system to lose track and the analog outputs of operational amplifier tend towards zero giving a false indication that the head is on track. The transistor circuit is such that an excessive head misalignment in one direction causes the operational amplifier U616 to produce a maximum negative analog output, and an excessive head misalignment in the other direction causes the amplifier U616 to produce a maximum positive analog signal.

As described above, comparator U608 produces a square wave B (FIG. 4) at one of its outputs and the complement at its other output. These signals are applied respectively to the emitters of transistors Q603, Q604. During normal operation the positive and negative half cycles of each of the square waves are substantially equal.

The base of transistor Q603 is connected back to the output of comparator U608 through resistor R632; and the base of transistor Q604 is connected back to the complement output of comparator U608 through resistor R633. Therefore, so long as the positive and negative half cycles of each of the signals are substantially equal the transistors Q603 and Q604 are non-conductive and the system operates normally.

However, for excessive head misalignments on one side of the servo tracks, transistor Q603 becomes conductive to cause operational amplifier U616 to produce a negative analog output of optimum value; and for excessive head misalignments on the other side of the servo tracks, transistor Q604 becomes conductive to cause operational amplifier U616 to produce a positive analog output of optimum value.

The particular circuit is designed so that the circuit of transistor Q603 or the transistor Q604 produce an overriding output to cause optimum positive or negative analog output to be produced by operational amplifier U616 when the inequality between the positive and negative half cycles of the signals referred to above exceeds a ratio of 4:1.

The analog output from the circuit of FIG. 2 is applied to an analog-digital converter circuit shown in FIG. 3. The circuit of FIG. 3 is a usual analog-digital converter circuit. The circuit includes an integrated circuit U601 which functions as a digital-analog converter, and which produces an analog signal on lead 100 having an amplitude corresponding to the binary coded digital signals D0–D5 applied to the input terminals A6–A1 of the integrated circuit. The analog output signal on lead 100 is applied to an analog follower stage U603 which produces the signal with the same polarity at its output. The output terminal of the stage U603 is connected to a 3.01 kilo-ohm resistor R613 which, in turn, is connected to a 3.01 kilo-ohm resistor R614. The junction of resistors R613 and R614 is connected to one of the inputs of an analog inverter stage U604. The other input of stage U603 is connected to a 1.5 kilo-ohm grounded resistor R610, and the other input of stage U604 is connected to a grounded 1.5 kilo-ohm resistor R611.

The output terminal of stage U603 is connected to a double CMOS switch U607, and the output terminal of stage U604 is also connected to the CMOS switch and to resistor R614. The CMOS switch is operated by an input D7 which, in one binary state causes the switch to pass the ouput from stage U603, and in a second binary state causes the switch to pass the output from U604. In this way, the analog output applied to comparator U609 is either positive or negative, depending upon the sign of the digital input, as indicated by the state of signal D7.

The output terminal of the CMOS switch is connected to one input of comparator U609 through a 10 kilo-ohm resistor R623, and the analog signal from the circuit of FIG. 2 is also applied to that input through a 10 kilo-ohm resistor R624. The other input of the comparator U609 is connected to a 5.1 kilo-ohm grounded resistor R627. The output terminal of comparator U609 is connected through a diode CR603 to the base of an NPN transistor Q602 which may be of the type designated 2N2222. The emitter of transistor Q602 is grounded, and the base and collector are connected to the positive terminal of the 5 volt unidirectional source through a 10 kilo-ohm resistor R630 and through a 3.3 kilo-ohm resistor R631 respectively.

Accordingly, whenever the analog signal from the circuit of FIG. 2 is different from the binary coded digital signal D0–D5 applied to integrated circuit U601, an error signal develops, which causes comparator U609 to produce an output. This output is amplified by transistor Q602, and is fed back to an up-down counter (not shown) which causes the counter to count up or down, depending upon the sign as indicated by signal D7. The counter counts until the binary coded digital signal D0–D5 applied to integrated circuit U601 corresponds to the analog output of the circuit of FIG. 2, and the resulting binary coded digital signal is applied to the display 32. It will be appreciated that when the head being tested is misaligned, the circuit of FIG. 2 will generate an analog output, and that output is converted into a binary coded digital signal by the circuit of FIG. 3, so that the digital display 32 will display, for example, a decimal number representing the amount of misalignment of the particular head. The head is then adjusted until that number is reduced to zero, at which time the head is aligned with the servo tracks on the CE servo disc.

The invention provides, therefore, a relatively simple circuit and system for use in conjunction with disc drives, to permit the heads in the disc drive to be precisely aligned with one another and with the servo head. As stated above, the system could be used in conjunction with the servo head during normal operation of the disc drive to provide servo control signals for the servo head. For that purpose, it is merely necessary to apply the analog output of the circuit of FIG. 2 to an appropriate servo system which may, for example, be of the type described in U.S. Pat. No. 4,075,667—Rose et al.

The system of the invention has the following advantages over the prior art. In curve A of FIG. 4, peak a is of slightly different amplitude from peak b, and peak c is slightly different from peak d, because of normal distortion in the read channel, such as is caused by bandwidth limitations. Consequently, it is less accurate to compare a with d or b with c than to compare a with c or b with d. However, if baseline shift is present due to recovery from head selection, or from previous writing, as is shown in curve AA of FIG. 4, it can be seen that comparing a with c or b with d will yield an erroneous result. In the present invention, the magnitude of a+b is compared to c+d, so as to eliminate the effect of the bandwidth distortion and of the baseline shift.

It will be appreciated that while a particular embodiment of the invention has been shown and described, modifications may be made, and it is intended in the claims to cover all embodiments which come within the true spirit and scope of the invention.

What is claimed is:

1. In a disc drive which includes a plurality of read/write magnetic heads and a servo magnetic head mounted for simultaneous movement by an actuator in response to a servo signal from the servo head, and in which the positions of the read/write heads are individually adjustable with respect to the servo head, a system for indicating any misalignment of the individual read/ write heads as the particular head produces a cyclic position signal in response to position signals pre-recorded on alignment tracks of an alignment disc, each cycle of said cyclic position signal having a first segment with positive and negative peak amplitudes and a second segment with positive and negative peak amplitudes, the positive and negative peak amplitudes of said first and second segments being equal when the particular head is in registry with the corresponding alignment track, and the positive and negative peak amplitudes of one or the other segments decreasing when the particular head moves out of registry with the alignment rack to one side or the other thereof; said system including balanced gating circuitry having four output circuits for respectively producing four gating signals respectively timed to occur in time coincidence with respective ones of the positive and negative peak amplitudes of said first and second segments; a balanced input circuit connected to the particular head and including first and second outputs respectively applying the cyclic position signal and its complement to said gating circuitry to cause said gating circuitry to cause said gating circuitry to produce said four gating signals at the respective output circuits thereof; peak detector circuitry including four peak detector circuits respectively connected to said four output circuits of said gating circuitry to be individually gated by respective ones of said four gating signals, means connecting two of said peak detector circuits to the first output of said balanced input circuit and further means connecting the other two of said peak detector circuits to the second output of said balanced input circuit, said four peak detector circuits collectively detecting the positive and negative peak amplitudes of each of the two segments of each cycle of said position signal and providing four analog outputs corresponding thereto; and output circuitry connected to the outputs of said four peak detector circuits in said peak detector circuitry for producing an analog output signal having an amplitude corresponding to the difference between the algebraic sum of the positive and negative peak amplitudes of the first segment and the algebraic sum of the positive and negative peak amplitudes of the second segment.

2. The system defined in claim 1, in which said balanced input circuit includes a linear amplifier, and in which said system includes a summing circuit connected to said four peak detectors in said peak detector circuitry for producing an output signal representing the algebraic sum of the outputs of the four peak detector circuits, and an automatic gain control circuit connected to said summing circuit and responsive to the output thereof for producing an automatic gain control signal for said linear amplifier.

3. The system defined in claim 1, in which said gating circuitry contains a frequency-independent phase-shifting circuit so that the system may be used with a wide variety of recorded signals without adjustment.

4. The system defined in claim 1, and which includes circuitry connected to said peak detector circuitry for limiting the analog outputs thereof to a predetermined maximum.

5. The system defined in claim 1, and which includes an analog/digital converter coupled to the output of said output circuitry to convert the analog output signal therefrom into a corresponding digital signal; and a digital display device coupled to the output of the analog/digital converter.

6. The system defined in claim 1, in which said gating circuitry includes first and second comparators interconnected to provide a quadrature shift to the cyclic position signal from said balanced input circuit which is independent of frequency.

* * * * *